2,956,986
LINEAR POLYURETHANE-SEMICARBAZIDE

Hobson D. De Witt, New Wilmington, Pa., assignor to The Chemstrand Corporation, Decatur, Ala., a corporation of Delaware No Drawing. Filed Sept. 10, 1958, Ser. No. 760,064

14 Claims. (Cl. 260—77.5)

This invention relates to the production of synthetic polymeric products and in particular to the production of linear polyurethane-semicarbazides suitable for forming filaments, films, and plastic materials therefrom.

It is well-known that diisocyanates will react with and add to any chemical compound containing active hydrogens. In view of this property, diisocyanates have been reacted with chemicals having polyfunctionality for the creation of polymer chains of very large molecular size. It has previously been proposed to react diamines with diisocyanates to produce polyureas. However, it was found that polyureas produced in that manner were not entirely suitable for plastics. Thus, the reaction of diisocyanates with diamines is not commercially employed.

A more important reaction employing diisocyanates is that in which hydroxy-containing compounds, such as glycols, polyols, hydroxy-rich polyesters and polyethers react with diisocyanates to form highly useful polyureathanes. Worthy of note in this connection is the fiber-forming polymer formed by the reaction of 1,4-butanediol with hexamethylene diisocyanate.

Diisocyanates will also react with amino-alcohols to form polymers having both urethane and urea structures in the polymer chains. As in the case of the polyureas, the utility of the resulting urethane-urea polymers in the plastics field is limited. While amino-alcohols have been reacted with some degree of success with diisocyanate-modified polyesters to produce elastomers having both urethane and urea structures in the molecule, work along the line of finding a polymer derived from diisocyanates and amino-alcohols and having satisfactory fiber-forming properties has not been successful to date.

It is an object of this invention to provide linear polymers derived from diisocyanates and amino-alcohols which can be formed into fibers, filaments, films, and other useful materials. It is another object of this invention to provide a method for the production of new polymers which can be oriented into fibers and filaments for particular use in the textile industry. It is still another object of this invention to provide a composition of matter composed of diisocyanates and amino-alcohols, the reaction product thereof having valve for the production of fibers and filaments in the textile industry. Other objects and advantages of the invention will be apparent from the following detailed description.

The objects of this invention are attained by bringing together under reaction conditions the requisite amounts of an organic diisocyanate and an omega-monohydroxyhydrazide and continuing the resulting reaction until a high molecular-weight fiber-forming material is obtained. The reaction normally is carried out at an elevated temperature and at atmospheric pressure, although the reaction may be carried out at pressures above or below atmospheric pressure. The resulting polymer is linear and contains both urethane and semicarbazide structures and may be shaped to the desired form.

The diisocyanates are of the general formula $$O=C=N-R-N=C=O$$

where R is a divalent organic radical free from reactive substituents, preferably a hydrocarbon. It is preferred that R is a polymethylene radical containing 2–8 methylene groups.

Among the diisocyanates employed in the preparation of these linear polyurethane-semicarbazides are polymethylene diisocyanates, such as ethylene diisocyanate, trimethylene diisocyanate, tetramethylene diisocyanate, pentamethylene diisocyanate, hexamethylene diisocyanate, heptamethylene diisocyanate, octamethylene diisocyanate, etc.; alkylene diisocyanates such as propene-1,2-diisocyanate and butene-1,2-diisocyanate, diisocyanatocycloalkanes such as 1,3-diisocyanatocylopentane, 1,3-diisocyanatocyclohexane, and 1,4-diisocyanatocyclohexane; aromatic diisocyanates such as tolylene-2,4-diisocyanate, ortho-phenylene diisocyanate, meta-phenylene diisocyanate, para-phenylene diisocyanate, methylene bis-(4-phenyl isocyanate), diphenylene-4,4′-diisocyanate, naphthylene-1,5-diisocyanate; alkarylene diisocyanates such as $\alpha,\alpha'$-diisocyanato-p-xylene; and mixtures thereof. Other similar organic diisocyanates containing substituents which are essentially inert to the reactants employed may be used without departing from the scope of the invention, such as diphenylene-3,3′-dimethyl (or dimethoxy)-4,4′-diisocyanate.

The omega-monohydroxy-hydrazides employed in the preparation of the linear polyurethane-semicarbazides are of the general formula $$HO-R_1-\underset{\underset{O}{\|}}{C}-NH-NH_2$$

where $R_1$ is a divalent organic radical free from reactive substituents, preferably a hydrocarbon. Specific examples of such hydrazides where $R_1$ is a polymethylene radical include 3-hydroxy-propionic hydrazide, 3-hydroxy-butyric hydrazide, 4-hydroxy-butyric hydrazide, 5-hydroxy-valeric hydrazide, 3-methyl-5-hydroxy-valeric hydrazide, 6-hydroxy-caproic hydrazide, 7-hydroxy-enanthic hydrazide and 8-hydroxy-caprylic hydrazide. Specific examples where $R_1$ is an arylene, alkarylene radical, or cycloalkylene radical include para-hydroxy-benzoic hydrazide, para-(2-hydroxyethyl)-benzoic hydrazide, para-(3-hydroxypropyl)-benzoic hydrazide, para-(4-hydroxybutyl)-benzoic hydrazide, 3-(3′-hydroxypropyl)-cyclopentanecarboxylic hydrazide and 4-(3′-hydroxypropyl)-cyclohexanecarboxylic hydrazide.

The amounts of organic diisocyanate and hydrazide employed may vary without departing from the invention. In general, the diisocyanate is advantageously present in a molar amount substantially equal to the molar amount of hydrazide employed. In some reactions it may be desirable to produce a polymer having as terminal groups predominantly isocyanate groups in which event a slight excess of the diisocyanate is employed. In other reactions such terminal groups may not be desired in which case excess hydrazide may be used. While the molecular ratio of the reactants has no pronounced effect on the polymer obtained, a marked molecular excess of one reactant over the other creates a recovery problem due to the presence of the unreacted intermediate and is not economical.

In producing the polyurethane-semicarbazide polymers of the present invention, the polymerization may be conducted in the presence of catalysts as well as in the presence of molecular weight regulators. Other additives that modify the polymer such as delusterants, plasticizers, pigments, colorants, and oxidation inhibitors may also be incorporated in the polymer if desired.

The new polymers may be prepared by mass polymerization, solution polymerization, or aqueous suspension polymerization in a conventional manner. The polymerization may be conducted in batch lots, by continuous methods or by semi-continuous methods. In general, the process employed to prepare the polyurethane-semicarbazides involves a polymerization reaction which is easily controlled and requires no special equipment.

While the invention includes the production of polymers of relatively low molecular weight that may be useful in the manufacture of coating compositions, lacquers, and the like, it is primarily concerned with the production of polymers which have film- and filament-forming properties. Filaments may be produced from the polymer by melt spinning, i.e., by extruding a melt of the polymer through suitable orifices in a spinneret into a cooling atmosphere. Filaments may also be produced by conventional wet or dry spinning methods from solutions of the polymer. If the polymer is of sufficiently high molecular weight, the filaments so formed may be drawn at comparatively low temperatures to filaments having good tenacity and elasticity.

In order to more clearly understand the process of the present invention, the following examples are given which are intended to be illustrative and not limitative.

*Example I*

In a glass flask of suitable size there was dissolved 1.18 grams of 4-hydroxy-butyric hydrazide in 50 ml. of dioxane. The hydrazide is readily prepared from gamma-butyrolactone and hydrazine hydrate. To the resulting clear solution there was gradually added with stirring 1.68 grams of hexamethylene diisocyanate dissolved in 20 ml. of dioxane. A slightly exothermic reaction occurred resulting in a large deposition of white, fluffy material. After the addition of all the diisocyanate, the mixture was stirred and maintained at 50° C. for a period of one hour to complete the polymerization. After filtering, washing, and drying of the resulting polymer, it was found that the polymer had a melting point of 185–190° C. and that fibers could be pulled from the melt.

*Example II*

In a glass flask of suitable size there was dissolved 1.04 grams of 3-hydroxypropionic hydrazide in 50 ml. of dry dioxane. The hydrazide is readily prepared from beta-propiolactone and hydrazine hydrate. To the resulting clear solution there was added slowly with stirring 1.74 grams of meta-tolylene diisocyanate dissolved in 20 ml. of dry dioxane. An exothermic reaction occurred and an appreciable amount of white, fluffy material precipitated from solution. The mixture was stirred slowly and maintained at 50° C. for thirty minutes. The white, fluffy material which had precipitated was filtered, washed, and dried. The material melted at about 180–190° C. Fibers could be pulled from the melt.

When the above examples are repeated with other defined diisocyanates and mono-hydroxy hydrazides, similar results are obtained. For example, when tetramethylene diisocyanate, hexamethylene diisocyanate, and the like are employed, polymers capable of being formed into fibers having useful textile properties are obtained. Likewise, useful polymers are obtained when 3-hydroxybutyric hydrazide, 5-hydroxy-valeric hydrazide, and other hydrazides of the type are used.

It is not intended that the invention be limited solely to the details of the embodiments set forth above as it will be recognized by the man skilled in the art that numerous and obvious modifications conforming to the spirit of the invention may be made, and it is intended that the invention be limited solely by the scope of the appended claims.

What is claimed is:
1. A fiber-forming polyurethane-semicarbazide comprising the reaction product in about equimolar amounts of a diisocyanate of the general formula

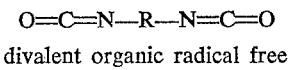

where R is a divalent organic radical free from reactive substituents and an omega-hydroxy-hydrazide of the general formula

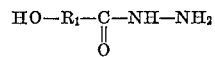

where $R_1$ is a divalent organic radical free from reactive substituents.

2. A fiber-forming polyurethane-semicarbazide as defined in claim 1 where R is a polymethylene radical containing 2–8 methylene groups and free from reactive substituents.

3. A fiber-forming polyurethane-semicarbazide as defined in claim 1 where R is a cycloalkylene radical containing 5–6 carbon atoms in the ring and free from reactive substituents.

4. A fiber-forming polyurethane-semicarbazide as defined in claim 1 where R is an arylene radical and free from reactive substituents.

5. A fiber-forming polyurethane-semicarbazide as defined in claim 2 where $R_1$ is a polymethylene radical containing 2–8 methylene groups and free from reactive substituents.

6. A fiber-forming polyurethane-semicarbazide as defined in claim 2 where $R_1$ is an arylene radical and free from reactive substituents.

7. A fiber-forming polyurethane comprising the reaction product of hexamethylene diisocyanate and 4-hydroxy-butyric hydrazide.

8. A method of producing a polyurethane-semicarbazide comprising reacting together a mixture of a diisocyanate of the general formula

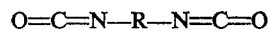

where R is a divalent organic radical free from reactive substituents and an omega-hydroxy-hydrazide of the general formula

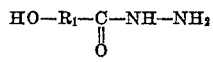

where $R_1$ is a divalent organic radical free from reactive substituents, said diisocyanate and said hydrazide being employed in about equimolar amounts.

9. A method as defined in claim 8 where R is a polymethylene radical containing 2–8 methylene groups and free from reactive substituents.

10. A method as defined in claim 8 where R is a cycloalkylene radical containing 5–6 carbon atoms in the ring and free from reactive substituents.

11. A method as defined in claim 8 where R is an arylene radical and free from reactive substituents.

12. A method as defined in claim 9 where $R_1$ is a polymethylene radical containing 2–8 methylene groups and free from reactive substituents.

13. A method as defined in claim 9 where $R_1$ is an arylene radical and free from reactive substituents.

14. A method of producing a polyurethane-semicarbazide comprising reacting together a mixture of hexamethylene diisocyanate and 4-hydroxy-butyric-hydrazide.

References Cited in the file of this patent
UNITED STATES PATENTS 2,511,544    Rinke _____ June 13, 1950

FOREIGN PATENTS 1,141,897    France _____ Mar. 25, 1957

OTHER REFERENCES

Iwakura: Chemical Abstracts, page 5,103, vol. 44 (1950).